(12) United States Patent
Labatie et al.

(10) Patent No.: US 12,430,552 B2
(45) Date of Patent: Sep. 30, 2025

(54) PROCESSING DATA BATCHES IN A MULTI-LAYER NETWORK

(71) Applicant: Graphcore Limited, Bristol (GB)

(72) Inventors: Antoine Labatie, Paris (FR); Dominic Alexander Masters, Bristol (GB); Zachary Frank Eaton-Rosen, London (GB); Carlo Luschi, Oxford (GB)

(73) Assignee: GRAPHCORE LIMITED, Bristol (GB)

( * ) Notice: Subject to any disclaimer, the term of this patent is extended or adjusted under 35 U.S.C. 154(b) by 1037 days.

(21) Appl. No.: 17/449,287

(22) Filed: Sep. 29, 2021

(65) Prior Publication Data

US 2023/0098994 A1   Mar. 30, 2023

(51) Int. Cl.
*G06N 3/08* (2023.01)
(52) U.S. Cl.
CPC ..................................... *G06N 3/08* (2013.01)
(58) Field of Classification Search
CPC ....................................................... G06N 3/08
See application file for complete search history.

(56) References Cited

U.S. PATENT DOCUMENTS

| | | | |
|---|---|---|---|
| 2020/0184320 A1* | 6/2020 | Croxford | G06N 3/048 |
| 2020/0302224 A1* | 9/2020 | Jaganathan | G06N 3/08 |
| 2021/0089903 A1* | 3/2021 | Murray | G06T 3/4046 |
| 2022/0108149 A1* | 4/2022 | Sohl-Dickstein | G06N 3/04 |
| 2022/0207359 A1* | 6/2022 | Yao | G06N 3/044 |
| 2024/0127586 A1* | 4/2024 | Brock | G06N 3/08 |
| 2024/0273873 A1* | 8/2024 | Cai | G06N 3/0442 |

OTHER PUBLICATIONS

NPL: Singh, Saurabh, and Shankar Krishnan. "Filter response normalization layer: Eliminating batch dependence in the training of deep neural networks." 2020. (Year: 2020).*

(Continued)

*Primary Examiner* — Li B. Zhen
*Assistant Examiner* — Sadik A Alshahari
(74) *Attorney, Agent, or Firm* — HAYNES AND BOONE, LLP

(57) ABSTRACT

A computer-implemented method of training a deep neural network, comprising, for each of one or more batches of training examples: processing the data in a forward pass through the layers of the network, by: applying a set of network weights to the input data to obtain a set of weighted inputs, normalising the weighted inputs based on statistics computed for each training example, transforming the normalised inputs by affine transformation parameters, applying an activation function to the transformed normalised inputs to obtain post-activation values, and normalizing the post-activation values based on one or more proxy variables sampled from a distribution defined by proxy distribution parameters, the normalization applied independently of training example; processing the data in a backward pass through the network to determine updates to learnable parameters comprising network weights, affine transformation parameters, and proxy distribution parameters, and updating the learnable parameters to optimise a predefined loss function.

16 Claims, 9 Drawing Sheets

(56) References Cited

OTHER PUBLICATIONS

NPL: Guo, Longteng, et al. "Normalized and geometry-aware self-attention network for image captioning." 2020. (Year: 2020).*
Labatie, Antoine; "Proxy-Normalizing Activations to Match Batch Normalization while Removing Batch Dependence", Jun. 2021, United Kingdom.
Masters, D et al.; "Making Efficient Net More Efficient: Exploring Batch-Independent Normalization, Group Convolutions and Reduced Resolution Training", Arxiv.Org, Cornell University, Ithaca, NY. Aug. 26, 2021.
Huang Y. et al.; "GPipe: Efficient Training of Giant Neural Networks using Pipeline Parallelism", Cornell University Library, Ithaca, NY. Jul. 25, 2019.
Arpit D et al.; "Normalization Propagation: A Parametric Technique for Removing Internal Covariate Shift in Deep Networks", Cornell University, Ithaca, NY. Jul. 12, 2016.
International Search Report and Written Opinion dated Feb. 1, 2023 for Application No. PCT/EP2022/077193. 12 pages.

* cited by examiner

PROCESSING DATA BATCHES IN A MULTI-LAYER NETWORK

TECHNICAL FIELD

The present disclosure relates to processing data batches in a multi-layer deep learning network.

BACKGROUND

FIG. 1A illustrates an example machine intelligence model. As will be familiar to a person skilled in the art of machine intelligence, machine intelligence begins with a learning stage where the machine intelligence algorithm learns a knowledge model. The model may be represented as a graph 60 of interconnected nodes 102 and links 104. Nodes and links may be referred to as vertices and edges. Each node 102 in the graph has one or more input edges and one or more output edges, wherein some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Each edge 104 communicates a value commonly in the form of a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. These results are sometimes referred to as activations. Each function is parameterised by one or more respective parameters (sometimes referred to as weights, though they need not necessarily be multiplicative weights). In general the functions represented by the different nodes 102 may be different forms of function and/or may be parameterised by different parameters.

FIG. 1B furthermore provides a simplified representation of an example node 102. Each node 102 represents a function of its inputs. Some nodes receive the inputs to the graph and some receive inputs from one or more other nodes. The output of some nodes form the inputs of other nodes, and the output of some nodes provide the output of the graph, and the inputs to the graph provide the inputs to some nodes.

Further, the function at each node is parameterised by one or more respective parameters, e.g. weights applied by a weighting function generator 151 and an activation function applied by an activation function generator 153.

The activation function generator 153 is configured to receive weighted input values and generate an output value based on the activation function. The activation function is attached to each node in the network and determines whether it should be activated ("fired") or not, based on whether each node's input is relevant for the model's prediction. Certain activation functions, such as sigmoid or tanh, also help normalise the output of each node to a range, for example between 1 and 0 or between −1 and 1. Other activation functions, such as ReLU, do not normalise the output.

In addition some form of normalisation may be added before or after the activation function in order to generate an output distribution with zero mean and unit variance. Certain problems can arise with this normalisation, as discussed later.

One type of machine intelligence model frequently used in the field of computer vision is a convolutional neural network (CNN). This is a type of deep neural network, where a deep neural network is a machine intelligence model comprising multiple layers, with the outputs of nodes 102 in a given layer forming the inputs of nodes 102 in a subsequent layer. In a standard deep neural network architecture, each node of a given layer is connected via a link 104 to every node of a subsequent layer. Networks with this all-to-all connectivity may be referred to as 'fully connected'. In a convolutional neural network however, each node of a layer is instead only connected to a subset of nodes in a subsequent layer. This works by applying a 'filter' of weights (which may also be referred to as a kernel) in a sliding window to an input tensor to determine a weighted input to a node 102, where the filter only applies to a subset of input values to the given layer at a time. The subset of inputs that the filter 'sees' at a time may be referred to as the receptive field. This is described in further detail with reference to FIG. 2. As described above, each node then applies some form of activation to the weighted inputs to generate an output.

Neural networks are typically trained by processing a set of training outputs and adjusting the weights in order to achieve a training objective by minimising a loss function. For example, where a neural network aims to predict a class for an input image by identifying an object class present in the images, the neural network is trained based on a training set of images for which the corresponding object classes are known. The training images are input to the neural network and processed by the sequence of layers to output a predicted class for the image, and the weights are updated so as to minimise a loss function which penalises predictions which differ from the true class corresponding to the given input image. The weights of a convolutional network are the parameters of the filters applied at each layer. Typically, a neural network, whether for image processing or other tasks, is trained to predict an output (in a given output format) based on input data, by processing a set of inputs for which the associated outputs are known, and updating the network to make the predicted outputs as close as possible to the known or 'ground truth' outputs. 'Training example' may be used herein to refer to a single input of the training set, and may also refer to any data of an intermediate layer of the network corresponding to the results of processing a single input of the training set, i.e. the output of a first layer generated by applying that layer to a single training input is also referred to herein as a single 'training example'.

There are various algorithms which may be used to compute weight updates. A commonly used algorithm is stochastic gradient descent, in which an estimated gradient of the defined loss function is computed and the weights are updated in the direction of the estimated gradient. Stochastic gradient descent may be applied for each training example. However, a more common training schema uses 'minibatches' of training examples within the training set, and computes an estimated gradient of the loss function for a mini-batch of training examples with respect to the weights of the network before updating the weights of each layer of the network based on this estimated gradient for the given mini-batch. An algorithm known as backpropagation may be used to compute the gradients with respect to the weights of the network by 'propagating' the gradient from later layers backwards through the network in a 'backward pass'. Each weight may be adjusted by subtracting a term proportional to the gradient of the loss function with respect to that weight, aggregated over the mini-batch of training examples. The processing of the input data through the layers of the network to generate a network output may similarly be referred to as a 'forward pass'.

Mini-batch sizes usually range from tens to hundreds of training examples, but may be selected as any size depending on the size of the training set. A typical choice of mini-batch size is 32, but the optimal batch size may depend on various factors, including memory considerations of the hardware computer system on which the model is implemented. Models may be trained on various batch sizes to determine an optimal value. Batch size is treated as a 'hyperparameter' of a model, in that it is not directly optimised in training but its value affects the training process.

Many deep neural networks employ a technique known as 'Batch Normalisation' to improve training. Batch Normalisation works by normalising intermediate tensors of the network, i.e. the outputs of the various layers of the network, to zero mean and unit variance for each mini-batch of training data, by computing a mean and variance of the elements of all training examples of the mini-batch, a single mean being computed for each channel in the intermediate tensors of the entire mini-batch. In other words, a mean and variance are computed for each channel, across all spatial dimensions and training examples of the mini-batch. For convolutional neural networks, Batch Normalisation is applied over a given mini-batch for all channels and spatial dimensions.

'Performance' herein refers to a numerical measure of the trained neural network based on some measurement of performance, such as accuracy, on an appropriate task. Convolutional neural networks may be evaluated based on their performance of a standard image processing task, with the network being trained and tested on a standard public dataset of images. One example of such a task is ImageNet classification, wherein objects in images are classified into a predefined set of classes, with the training data coming from the ImageNet database. Accuracy of the network's predicted classes may then be tested on a held-out dataset from the ImageNet database. Other network architectures may be evaluated according to their performance on different types of tasks.

While on the standard task of ImageNet classification, the performance of Batch Normalisation is high for mini-batches above approximately 24 training examples, this performance degrades in the regime of small mini-batch (24 training examples or fewer) due to an excessive amount of noise in the mini-batch statistics, meaning that the mean and variance calculated for each mini-batch is not representative of the mean or variance of the data in the training set as a whole.

Batch Normalisation (also referred to as Batch Norm) is one of many forms of normalisation that may be applied in deep neural networks to avoid issues associated with ill-behaved statistics of activations and gradients of the network during training.

An attempt to improve performance has been implemented as 'Layer Normalisation' or 'Group Normalisation'. These alternatives do not rely on mini-batch statistics and are said to be batch-independent. Layer Normalisation performs a normalisation based on the layer-wise mean and variance computed independently for the elements of each training example, rather than a mini-batch as a whole, and a normalisation is applied by applying a scaling and shifting of each element of the training example by its respective variance and mean. In other words, for Layer Normalisation a single mean and variance is computed for all spatial dimensions and channels for a single training example. Group Normalisation also computes separate means and variances for each training example but groups channels together and computes a separate mean and variance for each group of channels, applying the scaling and shifting of the elements of each group according to the respective mean and variance. However, on ImageNet, none of these batch-independent normalisation techniques currently match the performance of Batch Normalisation for convolutional neural networks trained with mini-batch sizes of greater than 24 training examples.

SUMMARY

One issue that normalisation aims to solve is that when training a deep neural network without applying normalisation, the distribution of intermediate tensors may become ill-behaved due to the accumulated effect of a succession of layers (this is sometimes referred to as 'mean-shift'). This effect leads to the distribution of values in deeper layers of the network becoming close to zero- or one-dimensional. In convolutional neural networks, this leads to imbalance in channels, as well as a phenomenon which may be referred to herein as 'channel collapse' wherein non-linear activations behave pseudo-linearly with respect to the channel-wise input distribution. These phenomena are harmful as they prevent the network from effectively using its whole width and depth, since the multiple channels are imbalanced and the later layers contribute less effectively to the network. Batch Normalisation solves this issue by normalising, at each layer, the pre-activation tensors based on channel-wise means and variances computed over each mini-batch of training examples. However, batch normalisation suffers from a performance degradation at small batch sizes.

The present invention presents a new batch-independent normalisation technique which matches the performance of Batch Normalisation without a degradation in performance as batch sizes decreases. The technique applies a novel processing step of "proxy normalisation" after applying a batch-independent method such as Layer Normalisation or Group Normalisation. This technique of proxy normalisation consists in applying a batch-independent normalisation technique such as Layer Normalisation or Group Normalisation, applying an affine transformation (comprising a scaling operation and a translation operation) and an activation function to the normalised tensors to generate post-activation tensors, and subsequently normalising the post-activation tensors based on a proxy variable to which the same affine transformation and activation function has been applied. The proxy variable may be sampled from a Gaussian distribution defined by a set of parameters learned during training. The mean and variance of the 'proxy activation', i.e. the activation function applied to the transformed proxy variable are computed, and these values are used to normalise the post-activation tensors. This technique overcomes the issue of mean-shift and enables training of deep neural networks across size regimes of mini-batch without performance degradation linked to batch size.

High performance at smaller batch sizes enables more efficient use of memory by not requiring large numbers of activations to be stored in memory at one time while processing a large mini-batch. The improved batch-independent normalisation described herein aims to retain the benefits of Batch Normalisation while avoiding the problems associated with batch normalisation at smaller batch sizes, thus facilitating memory-efficient implementations involving small batch processing.

The normalisation techniques described herein, lead to trained networks which perform well on evaluation tasks. Normalisation is performed both in training and when the trained network is applied to 'unknown' data for which an expected output is not used to inform the network further.

A first aspect disclosed herein provides a computer-implemented method of training a deep neural network comprising a sequence of multiple layers, the method comprising: receiving one or more batches of training data, each batch comprising at least one training example and each training example comprising an array of one or more values, and for each batch: processing the data in a forward pass through the sequence of layers of the neural network, the processing comprising, for at least some layers: applying a set of network weights to the input data of that layer to obtain a set of weighted inputs, and applying a combined normalisation-activation operation to the weighted inputs, the combined normalisation-activation operation comprising: a batch-independent normalisation step comprising normalising the weighted inputs based on normalising statistics computed for each training example of the batch to obtain a set of normalised inputs, an affine transformation step comprising scaling and shifting the normalised inputs by respective affine transformation parameters to obtain a set of transformed normalised inputs, the affine transformation parameters independent of the training example of the batch, an activation step comprising applying a non-linear activation function to each transformed normalised input to obtain post-activation values, and a proxy normalisation step comprising normalizing the post-activation values based on one or more proxy variables of the normalised values, the proxy variables sampled from at least one proxy distribution defined by proxy distribution parameters, and the proxy normalization applied independently of the training example to which each normalised value corresponds; processing the data in a backward pass through the network to determine updates to learnable parameters of the network based on a predefined loss function, the learnable parameters comprising at least the network weights, affine transformation parameters, and proxy distribution parameters; and applying the updates to the learnable parameters of the network so as to optimise the predefined loss function.

The normalised inputs, transformed normalised inputs, and post-activation values may be in the form of tensors comprising channel and batch size dimensions.

The affine transformation and proxy normalisation steps may be applied in dependence on the channel element of the respective tensor to which they are applied.

A set of proxy distribution parameters and a set of affine transformation parameters may be defined for each channel. Normalizing the post-activation values may comprise, for each channel, performing an affine transformation defined by the affine transformation parameters to the proxy variables sampled from the proxy distribution to obtain a transformed proxy variable, applying the non-linear activation function to the transformed proxy variable to obtain a post-activation proxy variable, and shifting and scaling the post-activation values based on a respective mean and variance of the post-activation proxy variables for each channel.

The at least one proxy distribution is a Gaussian distribution and wherein the proxy distribution parameters specify the respective mean and variance of the at least one proxy distribution.

The neural network may be a fully-connected neural network. The normalised inputs may be in the form of a tensor comprising spatial, channel and batch size dimensions.

The neural network may be in the form of a convolutional neural network. The batch-independent normalisation step may comprise layer normalisation and the normalising statistics may be computed over all spatial and channel dimensions of each training example.

The batch-independent normalisation step may comprise group normalisation, and the normalising statistics may be computed over spatial and channel dimensions for each of one or more groups, each group comprising a plurality of channels.

The normalised inputs may be in the form of a tensor comprising temporal, channel, and batch size dimensions. The neural network may be a recurrent neural network. Alternatively, the neural network may be a transformer network. A second aspect disclosed herein provides a non-transitory computer readable medium storing computer program instructions which when executed perform a method of processing data in a sequence of layers, the method comprising: receiving one or more batches of input data, each batch comprising at least one input example and each input example comprising an array of one or more values; and for each batch: processing the input data through the sequence of layers and producing, at a final layer, a set of output data corresponding to the input data. The processing comprises, for at least some layers: applying a set of network weights to the input data of that layer to obtain a set of weighted inputs, and applying a combined normalisation-activation operation to the weighted inputs, the combined normalisation-activation operation comprising: a batch-independent normalisation step comprising normalising the weighted inputs based on normalising statistics computed for each input example of the batch to obtain a set of normalised inputs, an affine transformation step comprising scaling and shifting the normalised inputs by respective affine transformation parameters to obtain a set of transformed normalised inputs, the affine transformation parameters independent of the input example of the batch, an activation step comprising applying a non-linear activation function to each transformed normalised input to obtain post-activation values, and a proxy normalisation step comprising normalizing the post-activation values based on one or more proxy variables of the normalised values, the proxy variables sampled from at least one proxy distribution defined by proxy distribution parameters, and the proxy normalization applied independently of the input example to which each normalised value corresponds.

A third aspect disclosed herein provides a computer system comprising memory storing parameters of a deep neural network having a sequence of multiple layers, and one or more processors configured to train the deep neural network by: receiving, at the one or more processors, one or more batches of training data, each batch comprising at least one training example and each training example comprising an array of one or more values; and for each batch: processing the data in a forward pass through the sequence of layers of the neural network, the processing in the forward pass comprising, for at least some layers: applying a set of network weights to the input data of that layer to obtain a set of weighted inputs, and applying a combined normalisation-activation operation comprising: a batch-independent normalisation step comprising normalising the weighted inputs based on normalising statistics computed for each training example of the batch to obtain a set of normalised inputs, an affine transformation step comprising scaling and shifting the normalised inputs by respective affine transformation parameters to obtain a set of transformed normalised inputs, the affine transformation parameters independent of the training example of the batch, an activation step comprising applying a non-linear activation function to each transformed normalised input to obtain post-activation values, and a proxy normalisation step comprising normalizing the post-activation values based on one or more proxy variables of the normalised values, the proxy variables sampled from at least one proxy distribution defined by proxy distribution parameters, and the proxy normalization applied independently of the training example to which each normalised value corresponds, processing the data in a backward pass through the network to determine updates to learnable parameters of the network based on a predefined loss function, the learnable parameters comprising at least the network weights, affine transformation parameters, and proxy distribution parameters, and applying the updates to the learnable parameters of the network so as to optimise the predefined loss function, and storing the updated parameters to memory.

The system may comprise a plurality of processors, each processor configured to process a respective stage comprising one or more layers of the network, wherein the system is configured to process consecutive layers on different processors by communicating, by a first processor, results of processing a first layer at the first processor to a second processor for processing a consecutive layer.

Each processor may store the network parameters in respective memory local to that processor, the network parameters comprising network weights, proxy distribution parameters and affine transformation parameters corresponding to the respective layers processed by that processor.

DETAILED DESCRIPTION

As described above, an issue with batch-dependent normalisation techniques is that a performance degradation can occur for small batch sizes (<24 on ImageNet). Therefore, batch-independent normalisation techniques may be used to overcome this problem. One example of a batch-independent normalisation technique is Layer Normalisation, which computes mean and variance across spatial and channel dimensions for each training example of a mini-batch during training. A number of batch-independent normalisation techniques will now be described as implemented at a layer of a convolutional neural network, wherein the normalisation is applied to the 'pre-activation tensor', i.e. after the convolution but before the activation function. It should be noted that the normalisation techniques are described below as they apply to a single layer l of a CNN, and that these normalisation techniques may be applied after any convolutional layers of the network. The pre-activation tensors at different layers have different spatial and channel dimensions, depending on the number of filters applied at that layer and other parameters of the convolution. However, the normalisation techniques described below can be applied in the same way, and are therefore described generally for an arbitrary convolutional layer without reference to a specific layer of the network.

Figure 1A:
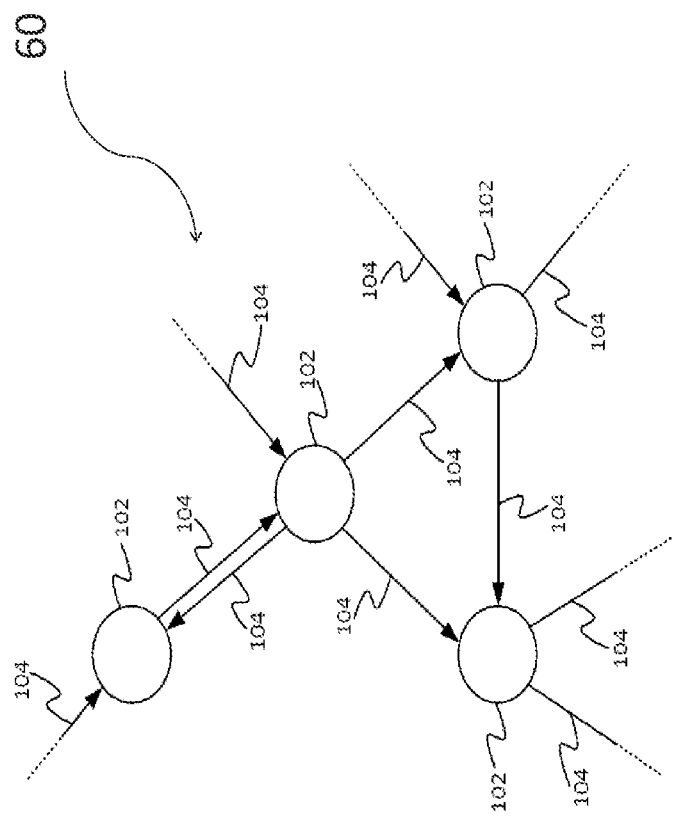
FIG. 1A shows an example machine intelligence model.
Figure 1B:
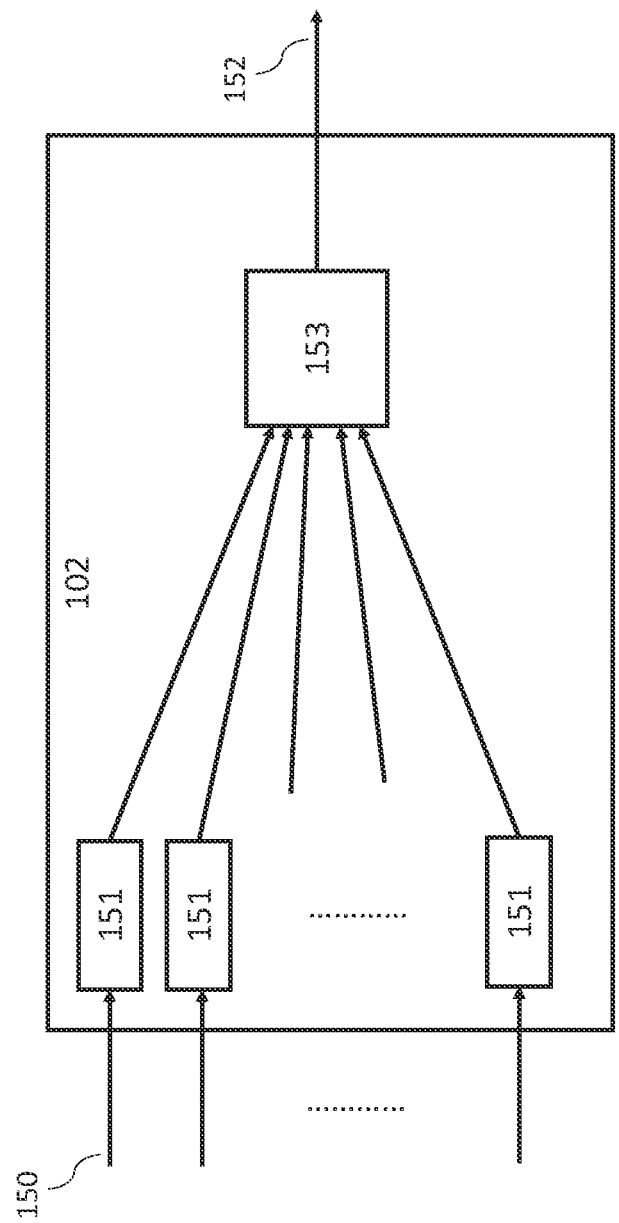
FIG. 1B shows a simplified example of a node of a machine learning model.
Figure 2:
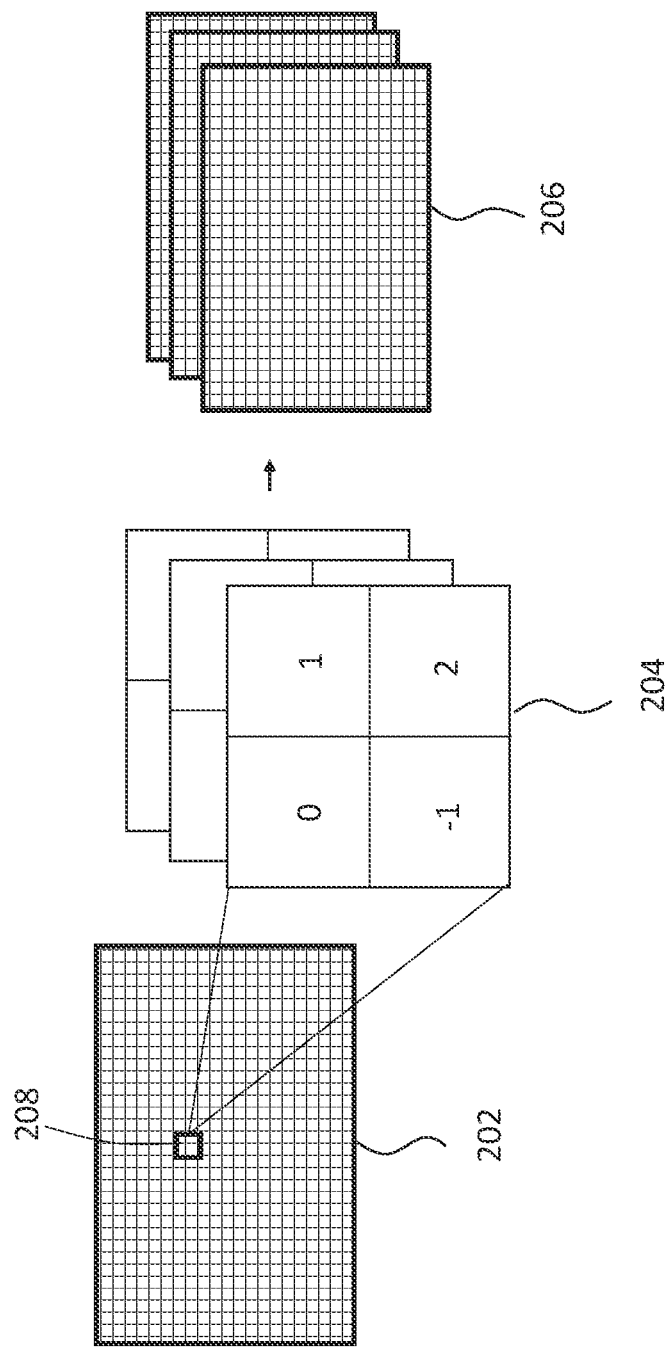
FIG. 2 shows an example of a convolutional filter being applied to a 2D image.

FIG. 2 shows how a convolutional filter may be applied within a single layer of a convolutional neural network. An image may be input to the network as a set of one or more arrays, each array comprising a set of pixel values. A greyscale image may be represented by a single pixel array. A colour image may be represented by three arrays, one for each colour of red, green and blue. The array corresponding to each colour in the input image may be referred to as a 'channel'. A single input to the network, such as a 2D image, may be represented by a tensor with dimension height× width×channels. For example, a colour image is represented by a tensor comprising a 2D pixel array for each of a red, green, and blue channel. A greyscale image can be represented by a single 2D pixel array.

For simplicity, FIG. 2 shows a 2D input array 202 with a single channel. At the given layer, the convolutional neural network has a set of multiple 'kernels' or filters, each with a set of weights to be applied to subsets of the input tensor. In the example shown, each filter 204 is a 2×2 array of weights. This is applied to the input tensor in an operation known as convolution, in which the filter 204 'slides' across the input tensor 202, and a dot product of the filter weights and the given window of the input is computed to form one element of a 'pre-activation' tensor 206. Each element of the pre-activation tensor is a weighted sum corresponding to the application of a filter 204 to a window of the input 202. An activation function such as the examples given above is then applied to the pre-activation tensor values to obtain a post-activation tensor. The activation function is non-linear as this allows the network to represent arbitrarily complex functions. An example 2×2 window 208 is shown. The activation function applied to the filtered values may be alternatively considered as a 'neuron' as defined for traditional fully-connected neural networks. The output elements for each filter form a 2D 'feature map', and the collection of feature maps resulting from applying a set of multiple filters is a tensor which may be input to a subsequent layer of the network. Convolutions are typically applied repeatedly to learn higher-level representations of an input image. More detail about convolutional architectures is described below.

As mentioned above, FIG. 2 shows a simplified example in which the input tensor has only two dimensions. In the case that the input tensor comprises multiple channels, each convolutional filter should also have a dimension corresponding to the number of channels, such that the dot product of the filter with a window 208 of the input may be computed. The dimension of the output 206 of the given convolutional layer is height×width×channels, where the number of channels of the output tensor is the number of filters applied at that layer. The height and width of the output tensor depends on how the convolution is defined, i.e.

by how much the filter is shifted from the previous window to compute each output (the stride) as well as the presence of any padding (which adds extra 0-valued elements around the edge of the input in order to increase the size of the output tensor).

Note that FIG. 2 shows only the tensor obtained after the application of the filter, which is a linear combination of inputs, and FIG. 2 does not show a subsequent application of an activation function to obtain an output tensor to be fed into a subsequent layer of the network. Generally speaking, a 'convolutional layer' refers to the layer applying the convolutional filter, while a second 'activation layer' is applied afterwards to obtain an output tensor of activations. Other operations may be performed, such as normalisation and pooling. To avoid confusion, the terms 'pre-activation' tensor and 'post-activation tensor' may be used to refer to tensors of the network before and after an activation function has been applied, respectively. FIG. 2 is intended as a simple illustrative example of how a convolutional layer changes the dimensionality of a given input. The application of an activation function is element-wise, and therefore respective pre- and post-activation tensors have the same dimension.

Figure 3A:
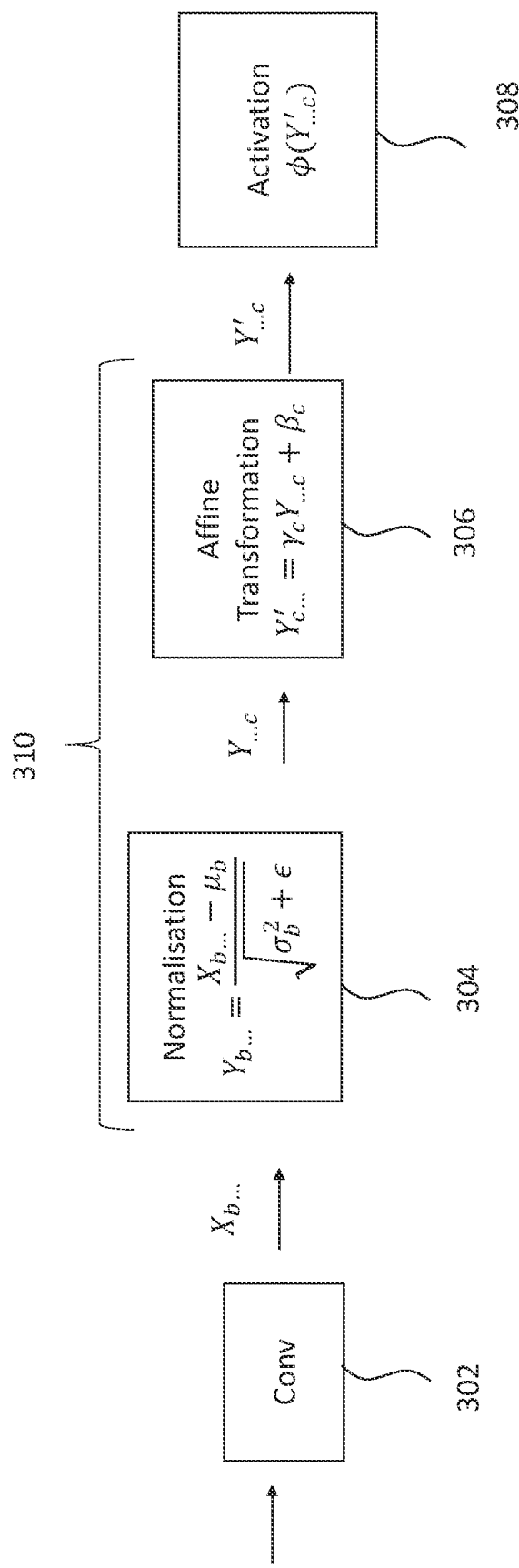
FIG. 3A shows a schematic block diagram of an example batch-independent normalisation technique.

FIG. 3A is a flow diagram describing how Layer Normalisation may be applied within a single layer of a convolutional neural network. Note that while the example implementations described herein relate to convolutional neural networks, the techniques described herein may be applied to various neural network architectures, such as fully connected neural networks, recurrent neural networks or transformer networks.

As described above and shown in FIG. 2, a convolutional layer applies a set of filters 204, each convolved with an input tensor to produce a tensor 206 of output values. However, this convolutional layer is followed by some form of non-linear activation functions in order to generate an input to the next layer of the network. Multiple such layers may be implemented, which process data sequentially in a forward pass to generate an output of the network. For clarity, the output tensor of a convolutional operation will be referred to herein as a pre-activation tensor, while the output tensor after the activation has been applied will be referred to as a post-activation tensor.

Layer Normalisation may be applied in convolutional neural networks after the convolution operation and before the application of the activation function. This provides a set of normalised inputs to the activation function, which can enable the network to effectively use its expressivity by re-centring the values of the tensor to the range in which the activation function is non-linear.

FIG. 3A shows a typical sequence of operations applied at a single layer-normalised layer of a convolutional neural network. The principle of Layer Normalisation is to compute statistics of the input tensor over its spatial and channel dimensions, for each training example of the given mini-batch independently. For convolutional networks the statistics are computed across all spatial dimensions and channels of the pre-activation tensor, while a fully-connected neural network does not have spatial dimensions and therefore computes statistics only over its channel dimensions. In other words, for a CNN, a Layer Normalisation operation computes a single mean $\mu_b$ and variance $\sigma_b^2$ for each training example b (also referred to herein as a batch element, being one training example within a batch of training examples) of a pre-activation tensor comprising four dimensions: batch element, height, width, and channel. Note that the pre-activation tensor is defined by four dimensions, rather than only the spatial and channel dimensions described above, as it is conventional to treat batch size as a fourth dimension of the network tensors, and for the network to process all examples of the batch in a single data structure.

As shown in FIG. 3, the input tensor I is received and a convolutional operation 302 applies $N_c$ filters to the input, therefore generating a pre-activation tensor $X_{b\alpha c}$, where b is the index representing the given batch element, a represents all spatial elements, typically height and width, and c is the index representing the channel, each channel containing the results of a different one of the $N_c$ filters applied to the input I. As mentioned above, Layer Normalisation is applied for each batch element of the tensor independently by computing statistics over all other dimensions. FIG. 3A uses the notation $X_{b...}$ to represent the elements of the pre-activation tensor for batch element b.

The first stage 304 of the Layer Normalisation process 310 is to apply a per-example normalisation to each element of the pre-activation tensor X to obtain a normalised pre-activation tensor Y. The per-training-example normalisation may be defined as follows:

$$Y_{b...} = \frac{X_{b...} - \mu_b}{\sqrt{\sigma_b^2 + \epsilon}}, \qquad (1)$$

where $\mu_b$ and $\sigma_b^2$ are the mean and variance, respectively, of the pre-activation tensor X across batch elements and spatial dimensions, for batch element b. It is well-known how to compute a mean and variance of a set of elements, and these computations will not be described further herein. The additional term $\epsilon$ in the denominator is a constant added for numerical stability, i.e. to avoid excessively large values in the normalised tensor Y which may occur for variances $\sigma_b^2$ very close to zero.

The second stage 306 of the Layer Normalisation process involves 310 applying an affine transformation, i.e. a transformation comprising translation and scaling, to the elements of the normalised pre-activation tensor Y in order to generate a transformed pre-activation tensor Y':

$$Y'_{...c} = \gamma_c Y_{...c} + \beta_c$$

This transformation multiplies each element of $Y_{...c}$ by a channel-specific factor $\gamma_c$ and adds a second channel-specific parameter $\beta_c$. This step is important as it restores some of the representative power lost in the normalising step. By normalising the values of the pre-activation tensor, the full range of values is lost, and therefore some of the representative capability of the tensor to represent the input is also lost. However, by introducing the parameters $\gamma_c$ and $\beta_c$, some of this range can be restored. It should be noted that the values of these parameters are not pre-specified. Instead, the values of $\gamma_c$ and $\beta_c$ are learned along with the filter weights during training of the network by optimising an objective function of the network being trained. This means that the affine transformation will be optimised with respect to the training goal.

These two steps together provide a transformed pre-activation tensor to which an activation function can be applied (step 308) to obtain a final output tensor Z:

$$Z_{...c} = \phi(Y_{...c}),$$

where $\phi$ is the chosen activation, for example a rectified linear unit (ReLU) defined as:

$$\phi(x) = \max(0, , x).$$

As described above, when ReLU is applied mostly to values above 0, it essentially acts as the identity function, and when it is applied mostly to values below 0, it essentially acts as zero. A neural network applying activations to data with such distributions loses its expressive power. The above-described Layer Normalisation 310 attempts to overcome the issue of losing the non-linearity of the activation function, by 're-centering' the pre-activation tensor to a distribution which occurs within the range of values for which the activation function is meaningfully non-linear. However, because Layer Normalisation is applied across all channels but the affine transformation is applied channel-wise, there is a likelihood that the distribution across channels in deeper layers becomes uncentered, and a channel-wise 'collapse' occurs.

Other forms of batch-independent normalisation may be used.

One example is Instance Normalisation. In Instance Normalisation, instead of computing a single mean and variance over every spatial dimension and channel of a training example, a separate mean and variance is computed for each channel. This may be implemented in training a neural network exactly as described for Layer Normalisation above, and shown in FIG. 3, with the normalisation step 304 replaced by the following operation:

$$Y_{b\ldots c} = \frac{(X_{b\ldots c} - \mu_{b,c})}{\sqrt{\sigma^2_{b,c} + \epsilon}},$$

where c is an index representing the channel. A mean and variance is therefore calculated per channel c of each training example b for the given mini-batch, and these quantities are used to normalise the pre-activation tensors before applying the same affine transformation 306 and activation 308 described above for Layer Normalisation.

Since Instance Normalisation is applied channel-wise, the normalisation can effectively 're-centre' the channel distributions at each layer and therefore avoid the problem of channel-wise collapse. However, Instance Normalisation causes the network's expressivity to be altered due to a lack of variability in the instance statistics. In other words, since each training example is normalised across spatial dimensions, the instance statistics are uniform over all training examples, which can lead to poor performance in tasks such as image classification.

Another example of batch-independent normalisation is Group Normalisation. This represents a middle ground between Layer Normalisation, wherein a single mean and variance is calculated across all channels, and Instance Normalisation, in which a different mean and variance is calculated for each channel. Group Normalisation defines a number of groups G into which the channels at a given layer are divided, and computes a mean and variance for each group g of the set of groups for each training example b. Group Normalisation may be applied exactly as described above for Layer Normalisation and Instance Normalisation, wherein the normalisation step 304 is applied as follows:

$$Y_{b\ldots g} = \frac{X_{b\ldots g} - \mu_{b,g}}{\sqrt{\sigma^2_{b,g} + \epsilon}},$$

wherein g is the index representing the group, and wherein X and Y have been reformulated as tensors of dimension $$\text{batch size} \times \text{height} \times \text{width} \times \frac{\text{number of channels}}{\text{number of groups}} \times \text{number of groups}$$

by grouping together data from channels in the same group. This is merely a reshaping operation, and Y may be reshaped again after the above normalisation step to a tensor of dimension batch size×height×width×number of channels, to which a channel-wise affine transformation 306 may be easily be applied. A separate mean and variance is therefore calculated for each training example b and group g for the given mini-batch before applying the same affine transformation 306 and activation 308 described above for Layer Normalisation.

Depending on the size of groups chosen, Group Normalisation may cause the network to suffer some degree of channel collapse and/or altered expressivity as described above for Layer Normalisation and Instance Normalisation respectively.

Figure 3B:
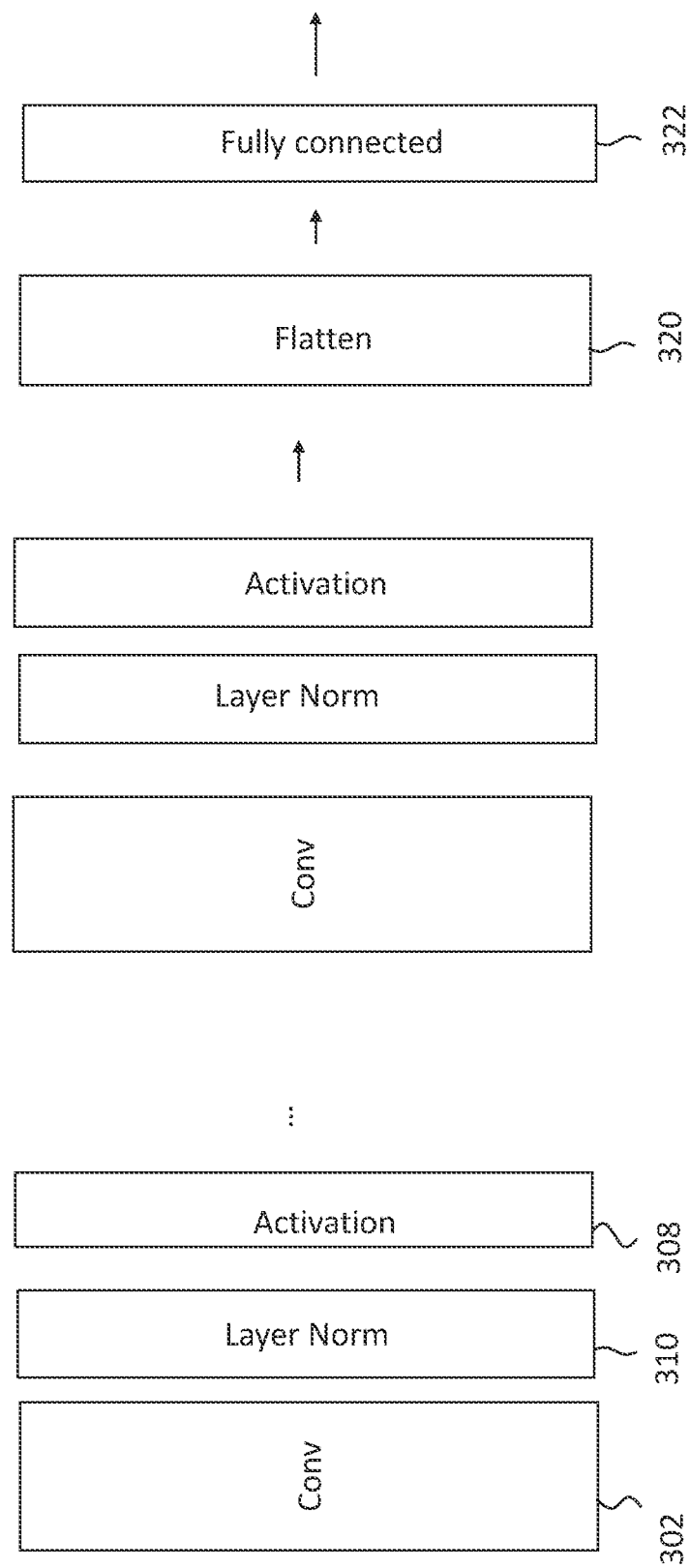
FIG. 3B shows a schematic block diagram of an example convolutional neural network architecture including Layer Normalisation.

FIG. 3B shows a simplified example architecture for a convolutional neural network with Layer Normalisation. In a forward pass, during training, the input to the network is passed through successive layers comprising convolution 302, Layer Normalisation 310, and activation 308. Various operations may be applied to intermediate tensors. For example, a pooling layer may be applied to a post-activation tensor as a form of 'downsampling', i.e. decreasing the dimensionality of the tensor, by applying a pooling operation wherein subsections (or 'patches') of the input are combined by averaging the values in that subsection (average pooling) or by taking the maximum value of that subsection (max pooling). Additionally, the network may employ residual connections in which data is passed through layers of a network, 'skipping' activations, in order to avoid a problem of exploding or vanishing gradients, wherein gradients become exponentially larger or exponentially smaller with increasing depth. This problem and the use of residual networks to solve them are well known in the art, and will not be further described herein.

At a final layer, the feature maps of the network are typically flattened and fed through a fully-connected layer, which generates a set of output values depending on the intended purpose of the network. For example, a multi-class classifier may apply a fully-connected layer which maps to the number of possible classes, and a softmax function may be applied to output a probability value for each class given the input. In training, a backward pass is also performed to compute the gradients of a loss function and update the parameters of the network accordingly. An example architecture which uses the approximate schematic structure shown in FIG. 3B is the ResNet50 architecture. It will be understood that different normalisation techniques may be applied to different variations of the architecture, as well as other deep neural network architectures including fully-connected, recurrent neural networks and transformer networks.

PROXY NORMALISATION

As mentioned above, Batch Normalisation addresses issues with training deep neural networks and enables training of more efficient and performant models. However, an issue with Batch Normalisation is that it induces a degradation in performance for training with small batch size, e.g. batches of 24 or below on ImageNet. This tends to be attributed to over-regularisation due to noisy mini-batch statistics. The batch-independent methods described above, while addressing the issue of performance degradation at small batch size, fail to match the performance of Batch Normalisation when the latter is considered at the optimal batch size for some tasks, such as ImageNet, where a batch size greater than 24 has been found to be optimal.

A number of batch-independent normalisation techniques are available, including Layer Normalisation and Group Normalisation. However, these techniques when used alone in training deep neural networks have not been effective in matching the performance of models trained with Batch Normalisation, due at least in part to the issue of channel distributions becoming uncentered when the normalisation step is applied over multiple channels, while the subsequent affine transformation is applied on a per-channel basis. A technique will now be described which combines a batch-independent normalisation step with a novel 'proxy' normalisation step to train a neural network, the combined method addressing the weaknesses of batch-independent normalisation to match the performance of Batch Normalisation at different batch sizes and therefore provide a suitable alternative to Batch Normalisation for all batch size regimes.

Figure 4:
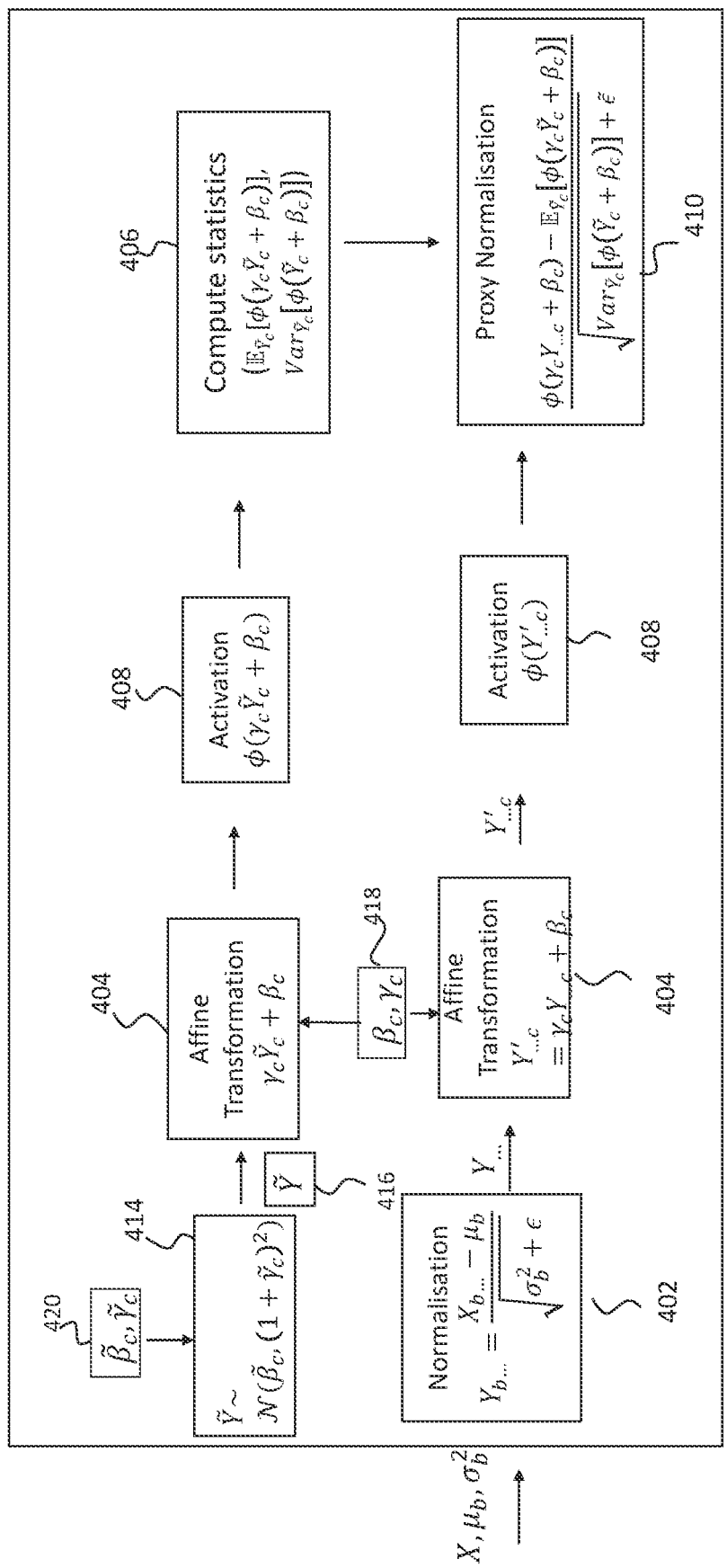
FIG. 4 shows a schematic block diagram of a proxy normalisation scheme used with Layer Normalisation.

FIG. 4 shows how such a combined normalisation technique 412 may be applied with Layer Normalisation 402 as a batch-independent normalisation technique followed by a post-activation proxy normalisation operation 410. The pre-activation tensor $X_{b\alpha c}$ at a layer of a convolutional neural network, as described above, has multiple dimensions, batch size×spatial dimensions×number of channels, where the spatial dimensions are typically height×width. The pre-activation tensor in FIG. 4 is shown as X for simplicity. The mean $\mu_b$ and variance $\sigma_b^2$ of the pre-activation tensor over all spatial dimensions and channels is computed for each training example b. A pre-activation Layer Normalisation 402 is applied to the pre-activation tensor X to obtain a normalised pre-activation tensor Y. The Layer Normalisation 402 is applied as follows:

$$Y_{b...} = \frac{X_{b...} - \mu_b}{\sqrt{\sigma_b^2 + \epsilon}} \quad (5)$$

where the statistics $\mu_b, \sigma_b^2$ are computed over all spatial indices and channels for each value of the batch index b. In other words, a mean and variance are computed for each training example of the batch, and each value of the tensor associated with that training example is scaled and shifted by the variance and mean computed for that training example. There is no dependence on the batch size, as each example within the batch is treated separately, hence this is a batch-independent technique.

After the normalisation step 402, an affine transformation 404 is applied, as described above with reference to FIG. 3. The affine transformation applies a shifting and scaling of the normalised pre-activation tensor Y to obtain a transformed pre-activation tensor Y', with the objective of restoring some of the representative power of the tensor values that was lost in the initial normalisation operation of Equation 5:

$$Y' = \gamma_c Y_{...c} + \beta_c,$$

where $\gamma_c, \beta_c$ are parameters updated during training along with the network weights.

As described above, the affine transformation 404 is applied to each channel, a single pair of parameters 418 $(\gamma_c, \beta_c)$ is learned for each channel, and this pair of values is applied over all training examples of the batch. In Batch Normalisation, the un-centering of the activations by the affine transformation 404 is undone in the normalisation step in subsequent layers. By contrast, this un-centering is not undone in subsequent steps of normalisation with Layer Normalisation, since the normalisation is not applied channel-wise, but over all spatial and channel dimensions of the tensor, while the affine transformation is applied channel-wise. This allows the affine transformation to shift the distribution at each channel up or down. This contributes to the phenomenon described earlier, known as channel-wise collapse, and can cause the deeper layers of the network to behave pseudo-linearly with respect to the channel-wise distributions due to the shift of the distributions relative to the effective domain of the activation function, for example ReLU, where a distribution which is concentrated mainly in the negative domain or mainly in the positive domain will result in an almost linear activation with respect to the pre-activation tensor.

To address these issues, a proxy normalisation is described, which is applied to the post-activation tensors. First, an activation function 408 is applied to the normalised and channel-wise transformed pre-activation tensor Y'. This activation $\phi$, as described above, can be selected from among a plurality of suitable non-linear functions, a commonly selected example being ReLU, defined earlier. The activation 408 is applied element-wise to the pre-activation tensor Y' to obtain a post-activation tensor of equal dimension:

$$\phi(Y'_{...c}) = \phi(\gamma_c Y_{...c} + \beta_c).$$

Finally a proxy normalisation is applied to the post-activation values. The principle of the proxy normalisation is to normalise the activation $\phi(Y'_{...c})$ by assimilating it with a proxy term $\phi(\gamma_c \tilde{Y}_c + \beta_c)$, where $\tilde{Y}_c$ is a proxy variable 416 sampled from a Gaussian distribution. First the proxy variable $\tilde{Y}_c$ is sampled in a sampling step 414:

$$\tilde{Y}_c \sim \mathcal{N}(\tilde{\beta}_c, (1+\tilde{\gamma}_c)^2),$$

where $\tilde{\beta}_c, \tilde{\gamma}_c)^2$ are additional parameters learned in training, $\tilde{\beta}_c$ being the proxy mean and $(1+\tilde{\gamma}_c)^2$ being the proxy variance. $\tilde{\beta}_c$ and $\tilde{\gamma}_c$ should be close to 0 to ensure that the proxy variable is approximately normalised to a mean of zero and a variance of 1 in each channel. This is typically realised by letting these parameters be subject to weight decay during training.

The same affine transformation 404 described above for the pre-activation tensor is also applied to the proxy variable:

$$\gamma_c \tilde{Y}_c + \beta_c,$$

where $\gamma_c, \beta_c$ are the same parameters applied in the affine transformation of the pre-activation tensor. It should be noted that the proxy variable $\tilde{Y}_c$ is denoted with a single channel index so as to reflect the stochastic nature of the proxy variable, which is sampled as a random variable from a proxy distribution defined for each channel.

The activation 408 is also applied to the transformed proxy variable in the same way as it is applied to the transformed pre-activation tensor Y' to obtain a 'post-activation' proxy variable:

$$\phi(\gamma_c \tilde{Y}_c + \beta_c)$$

The proxy normalisation is then performed as follows:

$$\tilde{Z} = \frac{\phi(\gamma_c Y_{...c} + \beta_C) - \mathbb{E}_{\tilde{Y}_c}[\phi(\gamma_c \tilde{Y}_c + \beta_c)]}{\sqrt{\left(Var_{\tilde{Y}_c}[\phi(\gamma_c \tilde{Y}_c + \beta_c)] + \epsilon\right)}}. \quad (10)$$

$\mathbb{E}_{\tilde{Y}_c}[\phi(\ldots)]$ represents the expected value of the post-activation proxy variable according to the sampled proxy variables. Similarly, $VAR_{\tilde{Y}_c}[\phi(\ldots)]$ represents the variance of the post-activation proxy variable based on the sampled proxy variables. E is a constant added to the denominator to ensure numerical stability.

Proxy normalisation assumes that $Y_{...c}$ remains channel-wise normalised as processing is carried out through the layers of the network, and the parameters $\tilde{\beta}_c, \tilde{\gamma}_c$. The purpose of proxy normalisation is to apply a correction to the post-activations to compensate for the effect of mean shift via the proxy variable defined by the parameters $\tilde{\beta}_c, \tilde{\gamma}_c$, which are optimised in training. In deeper layers, pre-activations remain close to normalised due to this proxy normalisation and there is a reduction in channel collapse.

Note that while the above description and FIG. 4 relate to a method using Layer Normalisation in the batch-independent normalisation step, the same techniques may be applied to other batch-independent normalisations to offset the problem of channel-wise collapse, including Group Normalisation, for example. Instance Normalisation does not have the issue of channel-wise collapse. However, as noted above, Instance Normalisation leads to altered network expressivity due to uniform instance statistics.

To implement Group Normalisation, the normalisation step can be replaced with the Group Normalisation operation described above:

$$Y_{b...g} = \frac{X_{b...g} - \mu_{b,g}}{\sqrt{\sigma_{b,g}^2 + \epsilon}},$$

where g is an index representing the group from a predefined set of groups, each group having a selected number of channels. As mentioned above, $Y_{b...g}$ may be reshaped after the Group Normalisation operation is applied to each group of channels, to obtain a reshaped tensor of dimension batch size×height×width×number of channels, to which a channel-wise proxy normalisation operation may be easily applied as described above in Equation 10.

Figure 5:
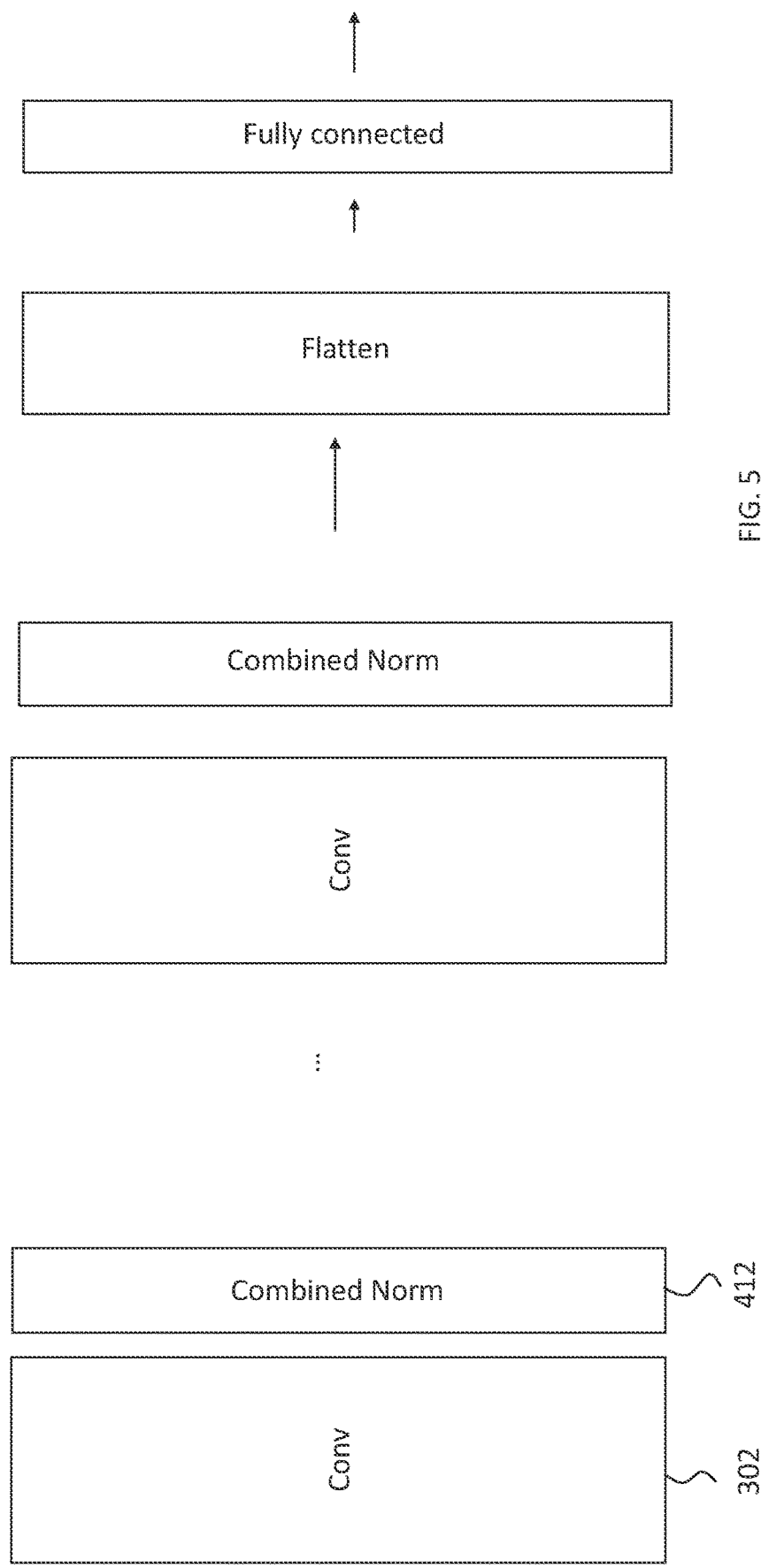
FIG. 5 shows a schematic block diagram of a convolutional neural network architecture including proxy normalisation.

FIG. 5 shows an example architecture using a combined normalisation 412, comprising a batch-independent normalisation of the pre-activations, applying the activation function, and applying a proxy normalisation to the post-activation values. This combined normalisation process may be applied after every convolutional layer, as described for Layer Normalisation in FIG. 3B. Existing architectures may be adapted to apply combined normalisation and activation in place of the batch-independent normalisation and activation layers of the standard batch-independent implementation described with reference to FIG. 3B.

Note also that while the above description relates to normalisation within convolutional neural networks, the same techniques may be applied to fully-connected, recurrent neural networks or transformer networks. For example, for a fully-connected neural network, a 'pre-activation' vector comprises a set of elements, each of which is a weighted sum of the activations from the previous layer corresponding to a single neuron. Each element may be referred to as belonging to a different channel as described earlier for convolutional networks. The length of the vector is therefore equal to the size or the number of neurons at that layer. Layer Normalisation, as described above for CNNs, may be applied to the set of pre-activation elements by normalising over the vector for each training example before applying the activation function. Similarly, by grouping sets of elements of the pre-activation vectors together into groups, and computing statistics for each groups, Group Normalisation may be applied to fully-connected networks in a similar way to that described above for convolutional networks, in this case without any spatial dimensions. Layer Normalisation and Group Normalisation are known in the field of deep learning for a variety of network architectures, and the various definitions of each normalisation for the different architectures are not described further herein.

Recurrent neural networks take as input sequences of data, typically represented along a time dimension, such that each element of the sequence is input to the network at a different time step. Input tensors or tensors at subsequent layers of the network may be represented with a temporal dimension, i.e. each tensor has dimensions: batch size× number of time steps×number of channels. Proxy normalisation may be therefore be applied with either layer or Group Normalisation as a batch-independent normalisation method, in much the same way as described above for convolutional networks, but where in this case statistics are computed over the temporal dimension in place of spatial dimensions.

TRAINING

Parameters of a neural network (e.g. weights of the convolutional filters for a CNN, or parameters added in normalisation, such as $\gamma_c, \beta_c$, mentioned above) are learned in training by iteratively updating the weights to encourage the outputs of the network towards a training objective. The training objective may, for example, be accurate prediction of an object class within in image, where the network predicts a class of object in the image. As mentioned above, a network may be trained based on data for which the desired output is known, in this example the training data may comprise a set of input images and a set of correct object classes corresponding to the input images. The training objective may be encoded in a loss function L which provides some measure of accuracy of the network's prediction. In this case, it may provide a measure of accuracy of the network's predicted classes for the training images compared with the correct or 'ground truth' object classes. An example loss function suitable for classification is cross-entropy loss, which may be used for a network predicting a probability that a given image has an object of a particular class from the set of possible classes. This loss provides a measure based on the likelihood of the ground truth data according to the probabilities predicted by the network.

As described briefly above, gradient descent may be used in training to update each weight based on an estimate of the gradient of the loss function with respect to the weights of the network. This is based on the idea that the gradient of the loss function gives the direction in which the loss function is increasing. Therefore, in order to minimise the loss, the weights should be updated in the opposite direction to the gradient. Each weight may therefore be updated as follows:

$$w_i = w_i - \alpha \frac{\partial L}{\partial w_i}, \quad (11)$$

where $\alpha$ is a constant sometimes referred to as the 'learning rate', which controls the size of the update, and $\partial L/\partial W_i$ is the component of the gradient corresponding to the weight $w_i$.

The loss function is defined so as to minimise the loss over all training examples, so the gradient of the loss function would in this case be an aggregation (sum or average) of gradients computed for each training example. In practice, the gradient is estimated based on the sum or average of a subset of training examples, i.e. a mini-batch, and the weight update is performed based on the computed gradient for that mini-batch. The gradient with respect to weights in different layers is backpropagated through the network in a backwards pass. Over time, the weights are adjusted and the network outputs become closer to the expected outputs based on the training ground truth.

An adjustment known as 'weight decay' may be applied to 'regularise' the network, by additionally subtracting a term proportional to the weight at each update step, therefore ensuring that weights don't grow out of control, which can lead to a network that 'overfits' the training data but performs poorly on data it has not seen before. Weight decay is a well-known regularisation technique in deep learning, and will not be described in further detail herein.

HARDWARE IMPLEMENTATION

The network may be implemented on one or more processors, and weights of each layer may be read from and written to any suitable memory. Typically, weights are stored externally to the processor carrying out the operations, and read in and written out to external memory as needed.

In one example implementation, one or more chip processors may be used to train and implement a neural network as described above, each processor having local memory in which weights and pre- and post-activation tensors of the network may be stored. Storing data locally has the advantages of improving efficiency as reading and writing data from and to external memory is no longer necessary. However, local memory imposes limits on the maximum batch size which can be processed at the same time. As described above, Batch Normalisation has poor task performance (such as accuracy in testing on an image classification task) when mini-batch sizes are too small.

A fix to this degradation of task performance increases the effective batch size by synchronising mini-batch statistics across several workers to obtain a 'normalisation batch size', i.e. the number of training examples over which statistics are computed, larger than the 'compute batch size', i.e. the size of batch used to compute gradients for updating the network. However, synchronising mini-batch statistics across workers is associated with a higher computational cost, thus reducing the efficiency of execution.

Thus, training models with Batch Normalisation in such an implementation is associated with a degradation of either task performance or efficiency of execution. The batch-independent normalisation approach described above, which combines either Layer Normalisation or Group Normalisation with proxy normalisation circumvents this dilemma and increases the performance of small-batch implementations without introducing excessive computational cost associated with synchronisation of mini-batch statistics.

During training, the network may be divided into several "stages" that are processed in a pipelined fashion across a plurality of chip processors to maximise processor utilisation. Each stage comprises one or more layers of the network. Since, as described above, the input at each layer is dependent on the output of the previous layer, each processor computes its activation values in a forward pass for its set of layers before passing the resulting activations to a processor processing the next set of layers in the network. Similarly, in the backward pass, each processor communicates the gradients computed for its stage to the processor computing the stage containing the next consecutive layer in the backwards direction. Following a pipelined paradigm, instead of computing an entire mini-batch simultaneously, gradients for a number of smaller "micro-batches" making up a mini-batch of data may be sequentially computed and accumulated, before applying the weight update for a full mini-batch. This model-parallel pipelined implementation reduces the memory requirements on each chip, allowing the use of larger micro-batches. An example multi-processor implementation for training a neural network is disclosed in Huang et al. 'GPipe: Easy Scaling with Micro-Batch Pipeline Parallelism' which is hereby incorporated by reference in its entirety.

When such a pipelined setting is chosen, an efficient implementation of proxy normalisation may consist in considering the proxy mean $\mathbb{E}_{\tilde{y}_c}$ and the proxy inverse standard deviation $$\frac{1}{\sqrt{Var_{\tilde{y}_c}[\phi(\ldots)]}}$$

described above as variables that are fixed 'inside' the pipelined computation, i.e. all micro-batches within the pipeline are processed according to the same set of proxy statistics, and the proxy statistics are only updated 'outside' the pipelined computation, once per parameter update, with the weights of the network being updated, the parameters defining the proxy distribution being updated and the proxy distribution being resampled in order to generate new proxy statistics $\mathbb{E}_{\tilde{y}_c}$, $Var_{\tilde{y}_c}$. With such an efficient implementation, the compute cost of proxy normalisation 'inside' the pipelined computation is the same as the compute cost of a standard affine transformation, since the proxy statistics are known and constant inside the pipelined computation, and the proxy normalisation amounts to scaling and shifting the activations by constant values. The added compute cost of proxy normalisation is approximately the same as the added cost of an affine transformation, where the additional compute costs 'outside' the pipelined computation can be neglected in relative terms as it is only performed once per update of a full mini-batch.

The proxy normalisation step described in equation 10 above is dependent on the parameters of the given layer of the network due to both the dependence of the activations on the weights applied to the tensor received at the given layer, and the parameters $\gamma_c$, and $\beta_c$ of the affine transformation. The proxy normalisation also has dependency on the network parameters through the proxy statistics, which are dependent on the parameters $\tilde{\gamma}, \tilde{\beta}_c$ of the affine transformation 404, and the proxy distribution parameters 420 ($\tilde{\gamma}_c$, $\tilde{\beta}_c$) defining the proxy variable $\tilde{Y}_c$ sampled to generate the proxy statistics $\mathbb{E}_{\tilde{Y}_c}$, $Var_{\tilde{Y}_c}$. The dependency of the proxy statistics is expressed first by sampling the Gaussian proxy distribution, and then applying the parameters 418 in an affine transformation 404 and then applying an activation function 408, and computing the statistics 406.

In a pipelined implementation, the proxy statistics could be recomputed for each micro-batch separately. However, it is more efficient to take the proxy statistics as static within the pipelined computations, and compute a forward and backward pass for a set of network parameters and proxy statistics for each minibatch, before applying an update outside the pipelined computation in which both the network parameters and the proxy statistics may be updated.

An example pipelined implementation comprises the following steps:

1. For each micro-batch within a mini-batch of training data, the data is processed through the layers in a forward pass, applying the proxy normalisation process described above (equation 10) for a current set of proxy statistics and network parameters, and the data is then processed backwards through the layers in the backward pass, computing 'direct' gradients of the loss function with respect to the network parameters as well as gradients with respect to the proxy statistics. This step is done in a pipelined fashion and may be referred to herein as the pipelined computation.

2. The gradients with respect to the proxy statistics (i.e. the proxy mean $\mathbb{E} \tilde{\gamma}_c[\phi( \ldots )]$ and inverse standard deviation $$\frac{1}{\sqrt{Var_{\tilde{Y}_c}[\phi(\ldots)] + \epsilon}},$$

described above) obtained from the pipelined computation may be backpropagated to obtain 'indirect' gradients with respect to the parameters $\tilde{\gamma}_c, \tilde{\beta}_c, \gamma_c, \beta_c$ that the proxy statistics depend on. This backpropagation is based on applying the chain rule to differentiate the proxy statistics with respect to the parameters on which they depend.

3. The 'indirect' gradients with respect to $\tilde{\gamma}_c, \tilde{\beta}_c, \gamma_c, \beta_c$ are added to the direct gradients with respect to $\tilde{\gamma}_c, \tilde{\beta}_c, \gamma_c, \beta_c$ obtained from the pipelined computation to obtain an overall gradient with respect to the parameters $\tilde{\gamma}_c, \tilde{\beta}_c, \gamma_c, \beta_c$. 4. All the parameters, including $\tilde{\gamma}_c, \tilde{\beta}_c, \gamma_c, \beta_c$ but excluding proxy statistics, are updated based on the overall gradients, according to an update scheme as described for example in equation 11 above.

5. The updated values of $\tilde{\gamma}_c, \tilde{\beta}_c, \gamma_c, \beta_c$ are forward propagated up to the proxy statistics. In this case 'forward propagation' refers to the computation of the new proxy statistics in dependence on the updated parameters and should not be confused with the forward propagation of data through layers of the network.

An increased vectorisation, that often leads to further efficiency of execution, can be obtained by concatenating and splitting the parameters $\tilde{\gamma}_c, \tilde{\beta}_c, \gamma_c, \beta_c$ and the proxy statistics along the channel dimension at the beginning and at the end of both steps 2 and 5. In other words, individual arithmetic operations are replaced by vector operations, which can be more efficient for hardware that is configured to compute vector operations in parallel.

The forward and backward propagations of steps 2 and 4 between the proxy statistics and the parameters $\tilde{\gamma}_c, \tilde{\beta}_c, \gamma_c, \beta_c$ may be performed by approximating the full proxy distribution with a sufficiently large number of randomly sampled points. Alternative options that could further improve the efficiency of execution include using either closed-form solutions or numerical heuristics to perform these forward and backward propagations either exactly or approximately with a sufficiently good precision.

Figure 6:
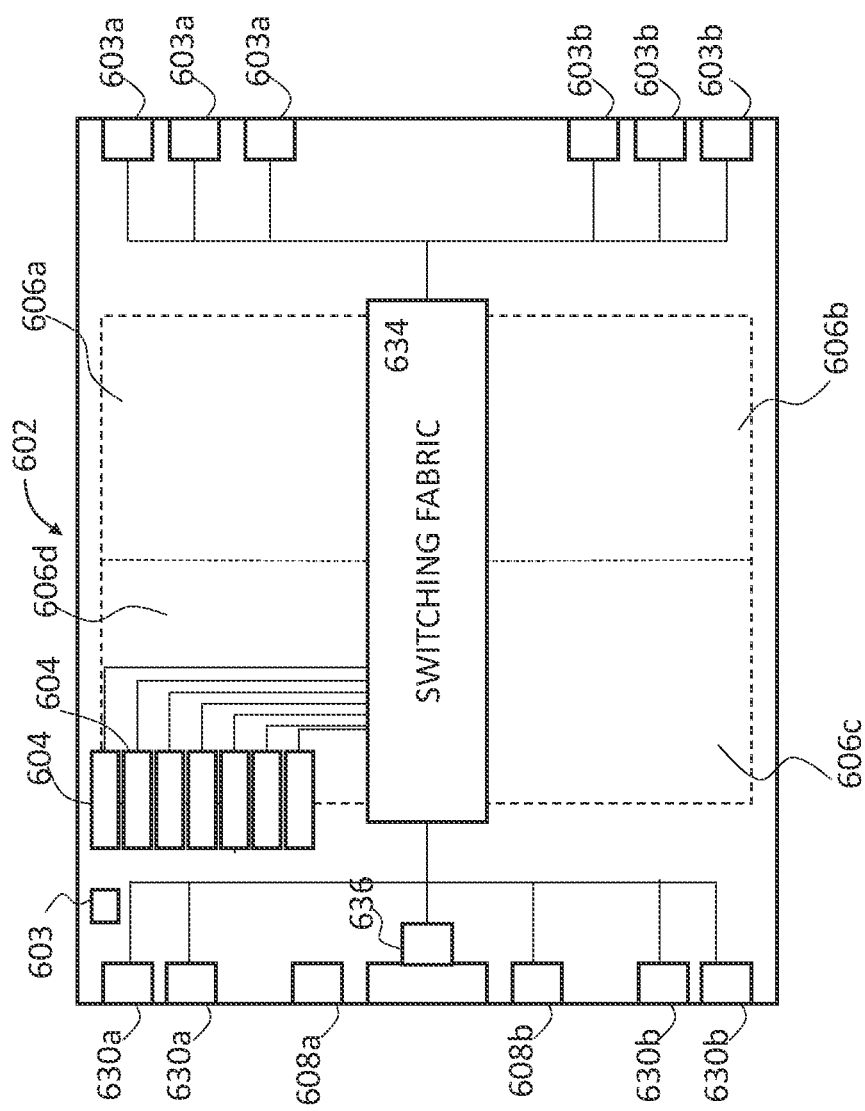
FIG. 6 shows the architecture of a chip processor.

FIG. 6 illustrates schematically the architecture of a single chip processor 602, which may be used singly or connected to other processors as a processing node. In a computer, the single chip processors can be connected together using inter-chip links on the chip. The processor 602 comprises multiple processing units referred to as tiles arranged on a single chip. In one embodiment, there are 1216 tiles organised in arrays 606a, 606b, 606c, and 606d. The processor 602 has two chip-to-host links 608a, 608b and 4 chip-to-chip links 630a, 630b arranged on an edge of the chip. The processor 602 receives work from a host (not shown) which is connected to the chip via one of the card-to-host links in the form of input data to be processed by the chip 602. The chips can be connected together into cards by a further chip-to-chip links 630a, 630b. The host may access a computer which is architected as a single chip processor 602 as described herein or a group of multiple interconnected single chip processors 602 depending on the workload from the host application.

When the processor is executing a machine learning or other complex or graph based application, vectors or tensors to be processed, for example inputs to a given layer, are provided to the processor from the host as workloads to be processed. Where vectors are small enough, a single vector may be processed by a single respective tile. It is more common for vectors in ML applications to be extremely large. In that case they may be broken up into fragments, and each fragment processed by an individual tile. Results of the processing are provided by each tile and may be combined at the same tile or other tiles, or supplied to the host for combining.

The chip 602 has a clock generator 603 which generates a clock signal from an on or off chip clock to control the timing of chip activity. The clock generator is connected to all of the chip's circuits and components. The chip 602 comprises a switching fabric 634 to which all tiles and links are connected by sets of connection wires to enable communication between tiles on the processor. Each tile has its own local memory. The tiles do not share memory.

Figure 7:
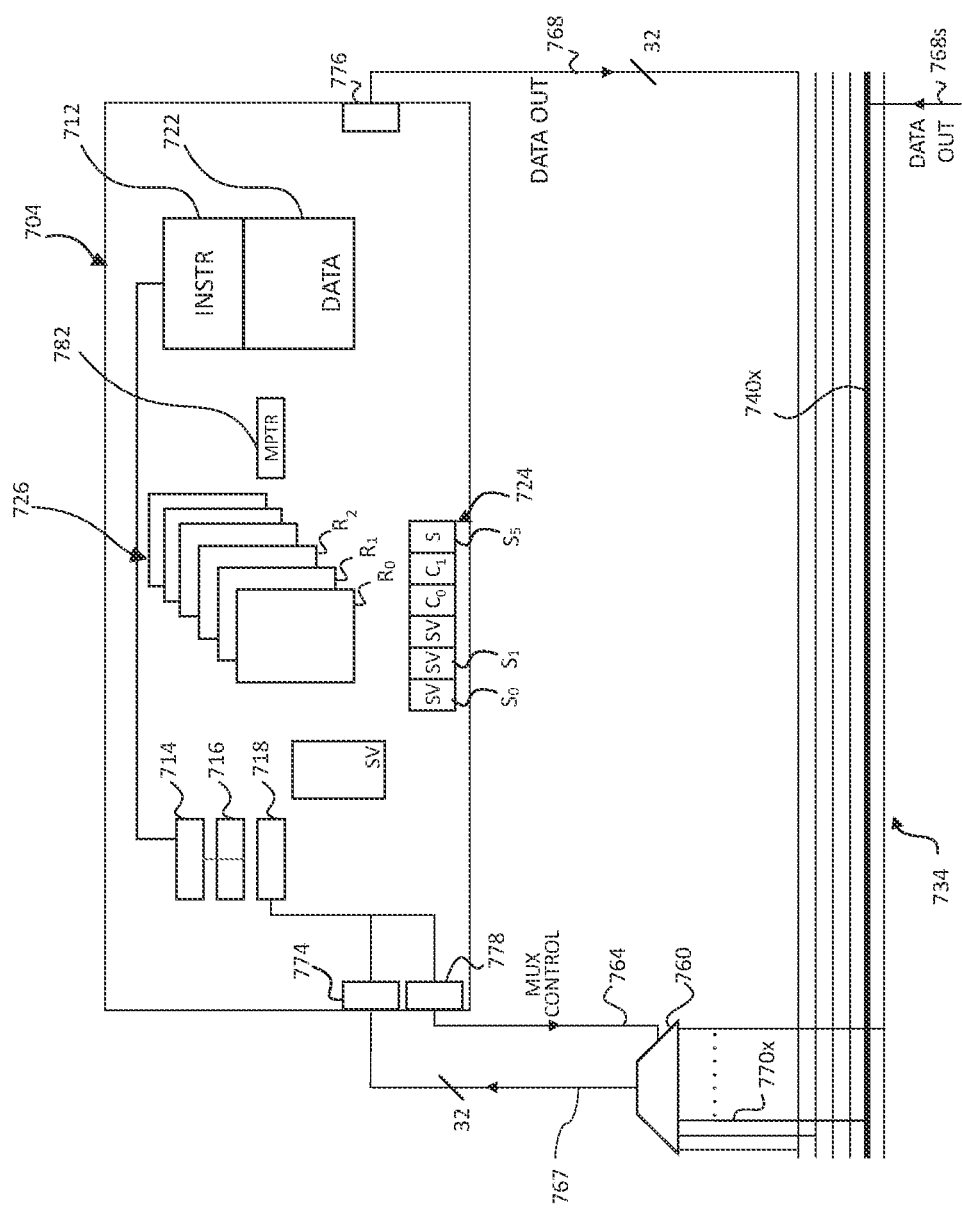
FIG. 7 shows an example tile of a chip processor.

FIG. 7 illustrates an example tile 704 in accordance with embodiments of the present disclosure. In the tile, multiple threads of execution are interleaved through a single execution pipeline. In some embodiments, each thread may process a vector or vector fragment in accordance with pre-compiled instructions stored on the tile in an instruction memory 712. The tile 704 comprises: a plurality of contexts 726 each arranged to represent the state of a different respective one of a plurality of threads; the shared instruction memory 712, which is common to the plurality of threads on that tile, but not shared by other tiles; a shared data memory 722 that is also common to the plurality of threads; a shared execution pipeline 714, 716, 718 that is again common to the plurality of threads; and a thread scheduler 724 for scheduling the plurality of threads for execution through the shared pipeline in an interleaved manner.

The data memory holds data supplied to the tile for processing, for example vector values of a whole vector or fragment of a vector, and results of that processing. For example, in the context of a forward pass as described earlier, the tile memory may hold fragments of an input vector in addition to the weights to be applied to the input data and may then store the resulting output data.

The thread scheduler 724 is schematically represented in the diagram by a sequence of time slots S0. . . S5, but in practice is a hardware mechanism managing program counters of the threads in relation to their time slots. The execution pipeline comprises a fetch stage 714, a decode stage 716, and an execution stage 718 comprising an execution unit (EXU) and a load/store unit (LSU). Each of the contexts 726 comprises a respective set of registers R0, R1. . . for representing the program state of the respective thread.

The fetch stage 714 is connected to fetch instructions to be executed from the instruction memory 712, under control of the thread scheduler 724. The thread scheduler 724 is configured to control the fetch stage 714 to fetch instructions from the local program for execution in each time slot.

Note that in normal operation the program loaded into each tile is determined by a processor or compiler to allocate work based on the computation graph of the machine intelligence model being supported. This computation graph defines what code (executable instructions) is stored and executed on each tile. Data (inputs and outputs) may be exchanged between tiles and or the host.

The invention claimed is:

1. A computer-implemented method of training a deep neural network comprising a sequence of layers, the method comprising:
receiving one or more batches of training data, each batch comprising at least one training example and each training example comprising an array of one or more values; and
for each batch:
processing the training data in a forward pass through the sequence of layers of the neural network, the processing comprising, for at least some layers:
applying a set of network weights to input data of that layer to obtain a set of weighted inputs, and
applying a combined normalisation-activation operation comprising:
a batch-independent normalisation step comprising normalising the weighted inputs based on normalising statistics computed for each training example of the batch to obtain a set of normalised inputs,
an affine transformation step comprising scaling and shifting the normalised inputs by respective affine transformation parameters to obtain a set of transformed normalised inputs, the affine transformation parameters independent of the training example of the batch,
an activation step comprising applying a non-linear activation function to each transformed normalised input to obtain post-activation values, and
a proxy normalisation step comprising normalizing the post-activation values based on one or more proxy variables of the normalised inputs, the proxy variables sampled from at least one proxy distribution defined by proxy distribution parameters, and the proxy normalisation applied independently of the training example to which each normalised input corresponds,
processing the training data in a backward pass through the neural network to determine updates to learnable parameters of the neural network based on a predefined loss function, the learnable parameters comprising at least the network weights, affine transformation parameters, and proxy distribution parameters, and
applying the updates to the learnable parameters of the neural network so as to optimise the predefined loss function,
wherein the normalised inputs, transformed normalised inputs, and post-activation values are in a form of tensors comprising channel and batch size dimensions,
wherein the affine transformation step and the proxy normalisation step are applied in dependence on a channel element of a respective tensor to which they are applied, and
wherein a set of proxy distribution parameters and a set of affine transformation parameters are defined for each channel, and wherein normalizing the post-activation values comprises, for each channel,
performing an affine transformation defined by the affine transformation parameters to the proxy variables sampled from the proxy distribution to obtain a transformed proxy variable;
applying the non-linear activation function to the transformed proxy variable to obtain a post-activation proxy variable; and
shifting and scaling the post-activation values based on a respective mean and variance of the post-activation proxy variables for each channel.

2. The method of claim 1, wherein the normalised inputs are in a form of a tensor comprising spatial, channel and batch size dimensions.

3. The method of claim 2, wherein the neural network is in a form of a convolutional neural network.

4. The method of claim 2, wherein the batch-independent normalisation step comprises layer normalisation and the normalising statistics are computed over all spatial and channel dimensions of each training example.

5. The method of claim 2, wherein the batch-independent normalisation step comprises group normalisation, wherein the normalising statistics are computed over spatial and channel dimensions for each of one or more groups, each group comprising a plurality of channels.

6. The method of claim 1, wherein the normalised inputs are in a form of a tensor comprising temporal, channel, and batch size dimensions.

7. The method of claim 6, wherein the neural network is a recurrent neural network.

8. The method of claim 6, wherein the neural network is a transformer network.

9. The method of claim 1, wherein the at least one proxy distribution is a Gaussian distribution and wherein the proxy distribution parameters specify a respective mean and variance of the at least one proxy distribution.

10. The method of claim 1, wherein the neural network is a fully-connected neural network.

11. A non-transitory computer readable medium storing computer program instructions which when executed perform a method of processing data in a sequence of layers, the method comprising:
receiving a batch of input data, including an input example having an array of values;
processing the input data in a forward pass through the sequence of layers; and
producing, at a final layer, a set of output data corresponding to the input data, wherein the processing comprises, for a first layer of the sequence of layers:
applying a set of network weights to the input data of the first layer to obtain a set of weighted inputs, applying a combined normalisation-activation operation comprising:
a batch-independent normalisation step comprising normalising the weighted inputs based on normalising statistics computed for the input example of the batch to obtain a set of normalised inputs,
an affine transformation step comprising scaling and shifting the normalised inputs by respective affine transformation parameters to obtain a set of transformed normalised inputs, the affine transformation parameters being independent of the input example of the batch,
an activation step comprising applying a non-linear activation function to each transformed normalised input to obtain post-activation values, and
a proxy normalisation step comprising normalizing the post-activation values based on one or more proxy variables of the normalised inputs values, the proxy variables sampled from at least one proxy distribution defined by proxy distribution parameters, and applied independently of the input example,
processing the input data in a backward pass through the neural network to determine updates to learnable parameters of the neural network based on a predefined loss function, the learnable parameters comprising at least the network weights, affine transformation parameters, and proxy distribution parameters, and
applying the updates to the learnable parameters of the neural network so as to optimise the predefined loss function,
wherein the normalised inputs, transformed normalised inputs, and post-activation values are in a form of tensors comprising channel and batch size dimensions;
wherein the affine transformation step and the proxy normalisation step are applied in dependence on a channel element of a respective tensor to which they are applied; and
wherein a set of proxy distribution parameters and a set of affine transformation parameters are defined for each channel, and wherein normalizing the post-activation values comprises, for each channel:
performing an affine transformation defined by the affine transformation parameters to the proxy variables sampled from the proxy distribution to obtain a transformed proxy variable,
applying the non-linear activation function to the transformed proxy variable to obtain a post-activation proxy variable, and
shifting and scaling the post-activation values based on a respective mean and variance of the post-activation proxy variables for each channel.

12. The non-transitory computer readable medium of claim 11, wherein normalising the weighted inputs comprises layer normalisation and the normalising statistics are computed over all spatial and channel dimensions of the input example.

13. The non-transitory computer readable medium of claim 11, wherein normalising the weighted inputs comprises group normalisation, wherein the normalising statistics are computed over spatial and channel dimensions for each of one or more groups, each group comprising a plurality of channels.

14. A computer system comprising memory holding parameters of a deep neural network comprising a sequence of layers, and one or more processors configured to train the deep neural network by:
receiving, at the one or more processors, a batch of training data, including a training example having an array of one or more values; and
processing the training data in a forward pass through the sequence of layers of the neural network, the processing comprising, for a first layer of the sequence of layers:
applying a set of network weights to input data of that layer to obtain a set of weighted inputs,
applying a combined normalisation-activation operation comprising:
a batch-independent normalisation step comprising normalising the weighted inputs based on normalising statistics computed for the training example to obtain a set of normalised inputs,
an affine transformation step comprising scaling and shifting the normalised inputs by respective affine transformation parameters to obtain a set of transformed normalised inputs, the affine transformation parameters independent of the training example,
an activation step comprising applying a non-linear activation function to each transformed normalised input to obtain post-activation values, and
a proxy normalisation step comprising normalizing the post-activation values based on one or more proxy variables of the normalised inputs, the proxy variables sampled from at least one proxy distribution defined by proxy distribution parameters, and applied independently of the training example,
processing the training data in a backward pass through the neural network to determine updates to learnable parameters of the neural network based on a loss function, the learnable parameters comprising at least the network weights, affine transformation parameters, and proxy distribution parameters, and
optimizing the loss function, including applying the updates to the learnable parameters of the neural network, and
storing the updated parameters to the memory,
wherein the normalised inputs, transformed normalised inputs, and post-activation values are in a form of tensors comprising channel and batch size dimensions;
wherein the affine transformation step and the proxy normalisation step are applied in dependence on a channel element of a respective tensor to which they are applied; and
wherein a set of proxy distribution parameters and a set of affine transformation parameters are defined for each channel, and wherein normalizing the post-activation values comprises, for each channel:
performing an affine transformation defined by the affine transformation parameters to the proxy variables sampled from the proxy distribution to obtain a transformed proxy variable,
applying the non-linear activation function to the transformed proxy variable to obtain a post-activation proxy variable, and
shifting and scaling the post-activation values based on a respective mean and variance of the post-activation proxy variables for each channel.

15. The computer system of claim 14, wherein each processor is configured to process a respective stage comprising one or more layers of the neural network, wherein the system is configured to process consecutive layers on different processors by communicating, by a first processor, results of processing a first layer at the first processor to a second processor for processing a consecutive layer.

16. The computer system of claim 15, wherein each processor is configured to store the network parameters in respective memory local to that processor, the network parameters comprising network weights, proxy distribution parameters and affine transformation parameters corresponding to the respective layers processed by that processor.

* * * * *